United States Patent
Ringström et al.

(10) Patent No.: US 8,565,094 B2
(45) Date of Patent: Oct. 22, 2013

(54) LOAD SCHEDULING IN WIDEBAND CODE DIVISION MULTIPLE ACCESS

(75) Inventors: Markus Ringström, Stockholm (SE); Karl Torbjörn Wigren, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 146 days.

(21) Appl. No.: 13/203,991

(22) PCT Filed: Aug. 23, 2011

(86) PCT No.: PCT/SE2011/051013
§ 371 (c)(1),
(2), (4) Date: Aug. 31, 2011

(87) PCT Pub. No.: WO2012/067564
PCT Pub. Date: May 24, 2012

(65) Prior Publication Data
US 2012/0120804 A1    May 17, 2012

Related U.S. Application Data

(60) Provisional application No. 61/414,666, filed on Nov. 17, 2010.

(51) Int. Cl.
*G01R 31/08* (2006.01)

(52) U.S. Cl.
USPC .......................................... 370/235

(58) Field of Classification Search
None
See application file for complete search history.

(56) References Cited

U.S. PATENT DOCUMENTS 7,307,977 B1 * 12/2007 Eran et al. ............ 370/342
7,397,842 B2 * 7/2008 Bottomley et al. ........ 375/148
8,175,537 B2 * 5/2012 Wigren ................ 455/67.13
8,359,040 B2 * 1/2013 Usuda et al. ............ 455/452.1
2009/0088080 A1 4/2009 Zhang et al.

(Continued)

FOREIGN PATENT DOCUMENTS

KR    20100014374 A    2/2010
WO    2008097145 A1    8/2008

OTHER PUBLICATIONS

Qualcomm, "System Performance of Uplink Interference Cancellation in Sync E-DCH Simulation Scenarios", 3GPP TSG-RAN WG1 #52, Sorrento, Italy, Feb. 11, 2008, R1-081067, pp. 1-19.

Wigren, T. "Soft Uplink Load Estimation in WCDMA." IEEE Transactions on Vehicular Technology, vol. 58, No. 2, Feb. 2009, pp. 760-772.

(Continued)

*Primary Examiner* — Robert Wilson
(74) *Attorney, Agent, or Firm* — Coats and Bennett, P.L.L.C.

(57) ABSTRACT

A method for load scheduling in a WCDMA communication system utilizing GRake equalizing radio reception comprises estimating (210) of channel estimates for a plurality of users. Combining weights are established (220) for a GRake equalizing reception for the present received uplink digital radio signals. Function parameters of a predicted future load measure function is predicted (230) as a function of individual grants of the plurality of users based on at least the channel estimates and the combing weights, taking sensitivity for interference suppression provided by the GRake equalizing for each of the plurality of users into account. The predicting further comprises adaptation of the function parameters for changed load equilibrium levels caused by the individual grants of the plurality users. A set of grants for the users is selected (240) based on the future load measure function. Uplink load is scheduled (250) according to the selected set of grants.

19 Claims, 4 Drawing Sheets

(56) References Cited

U.S. PATENT DOCUMENTS

2010/0035558 A1* 2/2010 Wigren .................. 455/67.13
2012/0082195 A1* 4/2012 Wigren .................... 375/220
2012/0120804 A1* 5/2012 Ringstrom et al. ......... 370/235

OTHER PUBLICATIONS

Wigren, T. et al. "Estimation of Uplink WCDMA Load in a Single RBS." IEEE 66th Vehicular Technology Conference, 2007, Sep. 30-Oct. 3, 2007, pp. 1499-1503, Baltimore, Maryland.

* cited by examiner

LOAD SCHEDULING IN WIDEBAND CODE DIVISION MULTIPLE ACCESS

TECHNICAL FIELD

The present invention relates in general to devices and methods for load scheduling in Wideband Code Division Multiple Access (WCDMA) systems, and in particular to load scheduling in systems utilizing GRake equalizing radio receivers.

BACKGROUND

WCDMA technology provides well established techniques for spectral utilization in high load mobile communication systems. Interference Cancellation (IC) and Interference Suppression (IS) may be used in WCDMA systems in order to achieve better performance in terms of e.g. peak data rates, coverage, system throughput and system capacity. IC and IS are applicable both for DownLink (DL) and UpLink (UL). However, most load limiting parameters that are difficult to control are connected with the UL signaling.

The basic idea behind IS is to combine the received radio signals such that interference is suppressed and the Signal-to-Interference-and-Noise Ratio (SINR) is maximized. There are many ways to achieve IS according to prior art. Non-exclusive examples are interference rejection combining, where the signals from more than one antenna are combined in order to suppress interference, and Generalized Rake+ (GRake+) (also referred to as non-parametric GRake), where interference is suppressed by whitening of the interference both in the temporal and the spatial domain.

Even though there exist several already known ways to achieve IS at link level, the knowledge of how to utilize the link level gain in order to increase the capacity or cell throughput in a WCDMA network is limited.

It first needs to be stressed that when advanced receivers such as GRake+ are applied, the conventional load measure without interference suppression is no longer valid. The conventional load measure is namely based on the fact that each user affects all other users in exactly the same way, from a load perspective, since conventional receivers do not handle the interference from other users in any explicit way in the receiver. However, with advanced receivers such as GRake+, a user's effect on other users is not the same on all users, and the effect is a function of the IC or IS efficiency.

Further, the load of the cell is used for scheduling e.g. of Enhanced UL (EUL) users, new and old. When doing this, the cell load measure described for GRake+ provides a larger total scheduling headroom as compared to pre-determined thresholds. However, the problem with the solutions in prior art is that there is no technology in prior art that allows the scheduler to address the detailed impact and contribution of different existing users, to the uplink Rise-over-Thermal (RoT) after GRake+ processing, in the scheduling process.

SUMMARY

A general object of the present invention is to provide opportunities to better utilize the increased capacity obtained by GRake equalizing radio reception during scheduling of uplink traffic.

The above object is achieved by methods and devices according to the enclosed independent patent claims. Preferred embodiments are defined in dependent claims. In general words, in a first aspect, a method for load scheduling in a WCDMA communication system utilizing GRake equalizing radio reception comprises estimating of channel estimates of present received uplink digital radio signals for a plurality of users. Combining weights are established for a GRake equalizing reception for the present received uplink digital radio signals. Function parameters of a predicted future load measure function are predicted. The predicted future load measure function is a function of individual grants of the plurality of users. The prediction is based on at least the estimated channel estimates and the established combing weights. The prediction takes sensitivity for interference suppression provided by the GRake equalizing for each of the plurality of users into account. The prediction further comprises adaptation of the predicted function parameters for changed load equilibrium levels caused by the individual grants of the plurality users. A set of grants for the users is selected giving a required set of user future loads for the predicted future load measure function defined by the predicted function parameters. Uplink load is scheduled according to the selected set of grants.

In a second aspect, a scheduler arrangement in a WCDMA communication system utilizing GRake equalizing radio reception comprises a channel estimator, an equalizer, a predictor, and a scheduler. The channel estimator is configured for estimating channel estimates of present received uplink digital radio signals for a plurality of users. The equalizer is configured for establishing combining weights for a GRake equalizing receiver for the present received uplink digital radio signals. The predictor is connected to the channel estimator and the equalizer. The predictor is configured for predicting function parameters of a predicted future load measure. The predicted future load measure function is a function of individual grants of the plurality of users. The predicting is based on at least the estimated channel estimates and the established combing weights taking sensitivity for interference suppression provided by the GRake equalizing receiver for each of the plurality of users into account. The predictor is further configured for adapting the predicted function parameters for changed load equilibrium levels caused by the individual grants of the plurality users. The scheduler is connected to the predictor. The scheduler is configured for selecting a set of grants for the users giving a required set of user future loads for the predicted future load measure function defined by the predicted function parameters. The scheduler is further configured for scheduling uplink load according to the selected set of grants.

In a third aspect, a node B in a WCDMA communication system utilizing GRake equalizing radio receivers comprises a scheduler arrangement according to the second aspect.

The present invention discloses one way to benefit from the IS gain on a system level through scheduling in order to increase the capacity. One advantage of the present invention is that the EUL scheduler will take the load after GRake+ processing into account in the scheduling decision. Other advantages are discussed in connection with different embodiments described further below.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

In the equations, vectors and matrices are generally denoted by bold symbols.

In the following description, the terms GRake+ and non-parametric GRake are used as synonyms, i.e. as equal and interchangeable terms.

Figure 1:
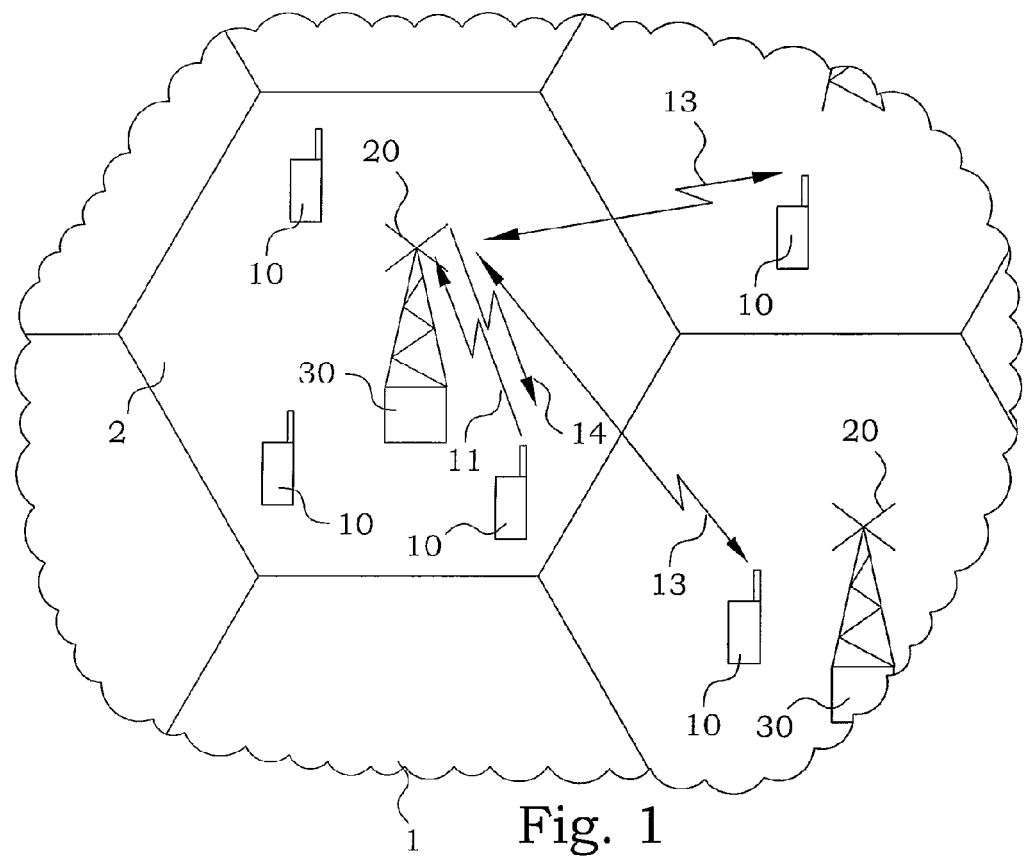
FIG. 1 is a schematic illustration of an example of a WCDMA communication system.

The present invention relates to arrangements and methods in WCDMA communication systems. FIG. 1 illustrates a schematic view of an embodiment of such a WCDMA communication system 1. A node B 30 communicates via its antenna/antennas 20 with a multitude of user equipments (UE) 10 situated within a cell 2 of the WCDMA communication system 1. Radio signals transmitted from the node B 30 to the UEs 10 are denoted as DL signals 14, and radio signals transmitted from the UEs 10 to the node B 30 are denoted as UL signals 11. The present invention mainly considers the UL signals, whereby arrangements for load scheduling typically are provided in the node B 30 or connected thereto. Besides the intentional UL signals 11, the node B 30 also receives interfering signals 13 from UE's not presently handled by the Node B in question.

In prior art, different methods for determining a more reliable load measure are available. These more reliable load measures give generally increased possibilities to schedule additional load. Some different aspects of such methods are summarized in mathematical terms in Appendix A.

Approaches addressing ways to measure the WCDMA uplink load, as seen after IS processing e.g. by a G-rake+ receiver, will be summarized in appendix B. That work proves that the load can be approximately expressed as a noise rise over the thermal noise power floor (the so called Rise-over-Thermal or RoT for short), individually for each user. The RoTs as seen by each of the users can then be combined into a measure of the uplink cell load. Essentially, the user that experiences the worst interference after GRake+ processing becomes dimensioning for the uplink cell load. Note that the technology disclosed in Appendix B hence evaluates the RoT seen by each user, i.e. the impact of the interference caused by the other users of the cell is addressed.

The load of the cell is typically used for admission of new users and scheduling of uplink EUL users, new and old. When doing scheduling, the above load measure provides increased total scheduling headroom as compared to pre-determined thresholds. However, there is no technology in prior art that allows the scheduler to take the detailed impact and contribution of different existing users, to the uplink RoT after GRake+ processing, into account in the scheduling process.

In Appendix B, it has been demonstrated how an uplink cell load can be computed in terms of the RoT after GRake+ and chip equalizer whitening of the interference, as experienced by each user. It is noted that the interference caused by a user on other users may have a very different effect on the RoT experienced by different users. However, the art as described in Appendix B teaches how the RoT experienced by the users of the cell can be combined to a single cell load, preferably using the user that experiences the worst RoT conditions.

Here below, it will be shown that a cell load measure may be constructed from user specific load measures and that certain actions may be taken towards specific users in order to increase the total cell capacity. The present invention uses this knowledge and takes the additional step of using the cell load and user specific load measures and the capacity increasing actions in the scheduling process in order to better utilize the different types of GRake interference suppression gain to increase cell capacity.

In Appendix C, it is shown how to couple the RoT to the grants of all users, using the power control loop. These calculations start from a present load that can be calculated according to Appendix B. Under the assumption that the interference can be treated as generated by a white noise process, the interference for a user after GRake+ processing can be related to the interference for the user before GRake+ processing by means of the combining weight vector. An assumption that the inner loop power control loop is closed after the GRake+ processing and that the control objective is to keep the signal to noise ratio at the target value makes it possible to deduce the effects of the inner loop. The target value of the SINR can in a first approximation be considered constant, since it changes more slowly than both grants and inner loop power control quantities. A new equilibrium state can be found to a certain grant. The RoT can (c.f. C32) be expressed as a nonlinear function of the grants, where the function factors comprise e.g. the SINR target and the combining weights of the GRake+ processing. These quantities could in more elaborate embodiments be extrapolated to the future time when the new grants are to be implemented, from previous and present values.

Scheduling

The resulting load of a transmission after a scheduling decision in the future can now be calculated using (C32). Typically the scheduling policy is determined by optimization of a function of the grants, subject to the vector of constraints resulting from (C32) being specified to be below a threshold. Here many alternatives are possible, e.g. proportional fair and max Channel Quality Indicator (CQI) strategies well known in prior art.

To explain how this works, it can be assumed that the baseline scheduler e.g. schedules users in a fair fashion regarding data rate. The resulting user specific loads may then vary quite drastically. As a motivating example, a scheduled data rate of e.g. 1 Mbps each for three users in a cell may result in a user specific load of 1 dB as seen by one user in the cell, but another user may experience a 3 dB load whereas the third user may experience a load of 6 dB, where load is expressed in RoT after GRake+ processing. The user experiencing the highest load (6 dB in this example), will be limiting the cell capacity, which is assumed to be set to 6 dB in the example.

In an embodiment, the load after GRake+ is instead calculated in the scheduler before the actual transmission and used as a basis in the scheduling decision. What is needed to make the calculation is apparent from the equation (C32). The main point is that given that equation, an optimal set of grants can be found that is consistent with the constraints imposed by a threshold with respect to (C32).

In one embodiment, the scheduling criterion may be equal load. Continuing the example, the scheduler may e.g. determine, by using (C32), that if the three users are granted 0.5 Mbps, 1 Mbps and 3 Mbps, respectively, all users will experience a load of 6 dB in a RoT after GRake+ sense. This means that the same scheduling threshold is met but the total scheduled data rate increases from 3 Mbps to 4.5 Mbps. This is achieved by a search for the set of grants that gives the highest throughput, while resulting in components of (C32) that are equal.

In other embodiments, other guiding scheduling principles may be applied, e.g. targeting an equal data rate, which is similar to the baseline solution, or water filling, where the user that causes the highest load, as seen by other users, is given a low grant and a users that does not cause much load is given a high grant. Other principles are also possible.

A more mathematical approach of two possible solutions of scheduling is given in Appendix D.

Once the scheduling is performed, the distribution of grants is made according to well-known prior art routines.

Figure 2:
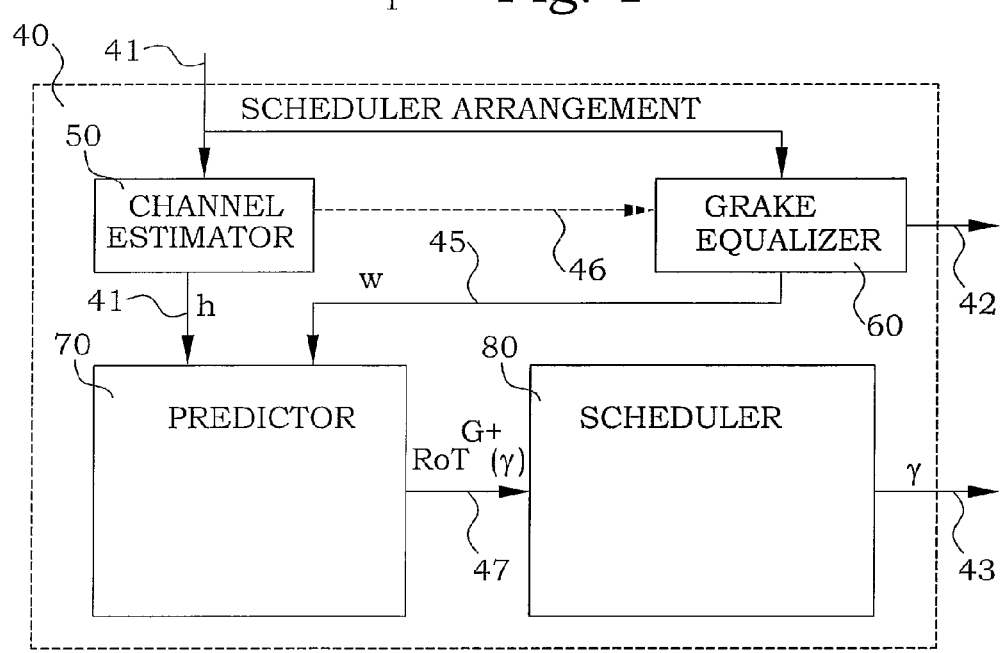
FIG. 2 is a schematic illustration of an embodiment of a scheduler arrangement.

FIG. 2 illustrates an embodiment of a scheduler arrangement 40. Such a scheduler arrangement 40 is typically provided in a node B, as e.g. illustrated n FIG. 1. The node B and scheduler arrangement 40 are configured for operating in a wideband code division multiple access communication system utilizing GRake equalizing radio receivers. The scheduler arrangement 40 comprises a channel estimator 50. The channel estimator 50 is configured for estimating channel estimates h of present received uplink digital radio signals for a plurality of users. The uplink digital radio signals are received at an input 41 to the scheduler arrangement 40. The scheduler arrangement 40 also comprises an equalizer 60, in this embodiment a GRake equalizer. The equalizer 60 is configured for establishing combining weights for a GRake equalizing receiver for the present received uplink digital radio signals and is therefore also connected to the input 41. The equalizer 60 may, depending on the actual utilized approach, make use of the channel estimates of the present received uplink digital radio signals. Such information is available through the channel estimator 50 and may be provided therefrom, as indicated by the broken arrow 46. The equalized signal is provided on an output 42 to be utilized in other parts of the system, e.g. for decoding of the information contained in the signals.

The channel estimator 50 and the equalizer 60 may be configured according to any prior art. The details of how these units operate are not of primary importance for providing the benefits of the present invention, as long as they provide reliable channel estimates and equalizations, respectively.

The scheduler arrangement 40 further comprises a predictor 70. The predictor 70 is connected to the channel estimator for receiving the channel estimates h 41. The predictor 70 is also connected to the equalizer 60 for receiving combining weights w 45 for the GRake equalizing receiver. The predictor 70 is configured for predicting function parameters of a predicted future load measure function. The predicted future load measure function is a function of individual grants of the plurality of users. This predicting of function parameters is based on at least the estimated channel estimates and the established combing weights, as has been described here above. As also have been described above, the predictor 70 is further configured for performing the prediction of the function parameters taking sensitivity for interference suppression provided by the GRake equalizing receiver for each of the plurality of users into account. In other words, the predictor incorporates the GRake equalizing effects into the prediction of future load situations, thereby enabling use of the benefits of the GRake equalizing for load scheduling purposes. The predictor 70 is furthermore configured for adapting the predicted function parameters for changed load equilibrium levels caused by the individual grants of the plurality users. The result is thus a future load measure function $RoT^{G+}$ 47.

The predicted future load measure function $RoT^{G+}$ 47, typically in the form of a set of function parameters, is provided to a scheduler 80, i.e. the scheduler 80 is connected to the predictor 70. The scheduler 80 is configured for selecting a set of grants for the users giving a required set of user future loads for the predicted future load measure function 47 defined by the predicted function parameters. In other words, the scheduler 80 uses the predicted future load measure function 47 to find a favorable set of grants that still fulfills some basic requirements concerning user future loads. This can be performed in many different ways. A simplest approach is to create a number of sets of individual grants, check which sets that will give rise to acceptable load situations and select the set of these acceptable sets that is "best" in some respect concerning the grant structure. Such selection procedures may also be performed in iterative manners, where a first "best" set of grants is used as a start for creating a next ensemble of sets to be tested for finding an even better set of grants. The predicted future load measure function 47 itself can also be used, utilizing different kinds of optimization procedures to find an optimum of the function under certain constraints and according to certain criteria. This was described more in detail above and in appendix D.

Thus, in a preferred embodiment, the scheduler 80 is further configured for optimizing a criterion function that is dependent on the individual grants, and for selecting the individual grants giving the optimization as the set of grants for the users. Then, the scheduler is preferably configured for performing the optimization under a constraint relation involving the user future loads according to the predicted future load measure function of individual grants.

The scheduler is further configured for scheduling uplink load according to the selected set of grants. The scheduling of grants γ is provided at an output 43.

Figure 3A:
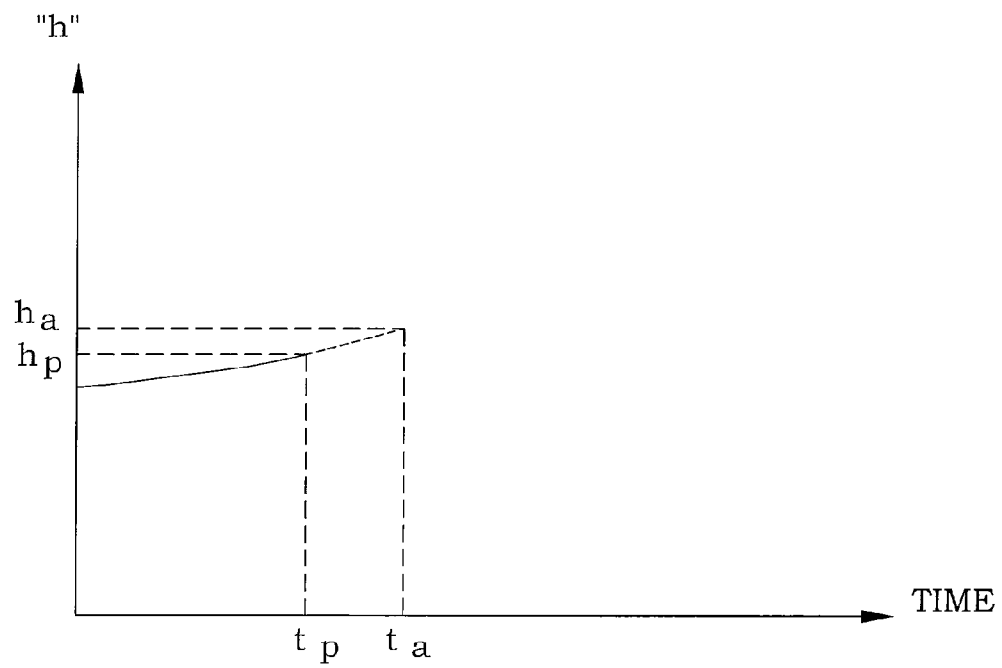
FIGS. 3A and 3B are diagrams illustrating extrapolation of channel estimates and combining weights into future time.

The above procedure is based on the measured load of users. The scheduler rather needs to use the predicted load for the same set of users. Hence one limitation of the basic embodiment is that the radio conditions should not vary too fast, say that they need to be stationary for several tens of milliseconds. A remedy to this situation would be to use extrapolation of the channel estimates over time, e.g. linear extrapolation, to provide a look ahead. FIG. 3A illustrates schematically such ideas. Channel estimates are provided continuously up to a present time $t_p$, where a present channel estimate $h_p$ is found. If a future set of grants is assumed to be applied at the time $t_a$, the channel estimate can be extrapolated from the previous behavior to obtain an extrapolated channel estimate $h_a$ at the application time $t_a$. In other words, the predictor is further configured for extrapolating the channel estimates to a future application time. The application time is a time when a present uplink load scheduling is assumed to be applied.

If the difference between $h_p$ and $h_a$ is likely to be very small, such an extrapolation may not be necessary and the present channel estimate $h_p$ may be used instead of the extrapolated channel estimate $h_a$. This condition and solution should be reasonable at least for stationary mobile broadband users, which are anyway the ones likely to use high rates and produce the most interference.

Figure 3B:
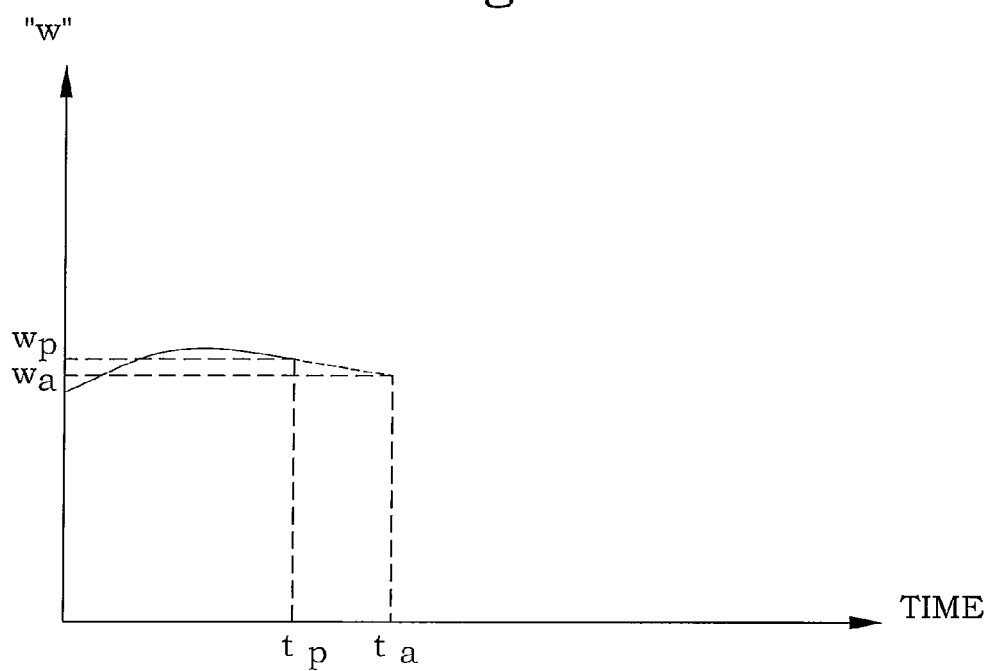

The same is valid also for the combining weights for the GRake equalizing receiver, as seen in FIG. 3B. Past and present values $w_p$ of the combining weights can be utilized for extrapolating a future combining weight value $w_a$ at the time of application of the set of grants that are to be determined. In other words, the predictor is further configured for extrapolating the combining weights to the future application time.

Figure 4:
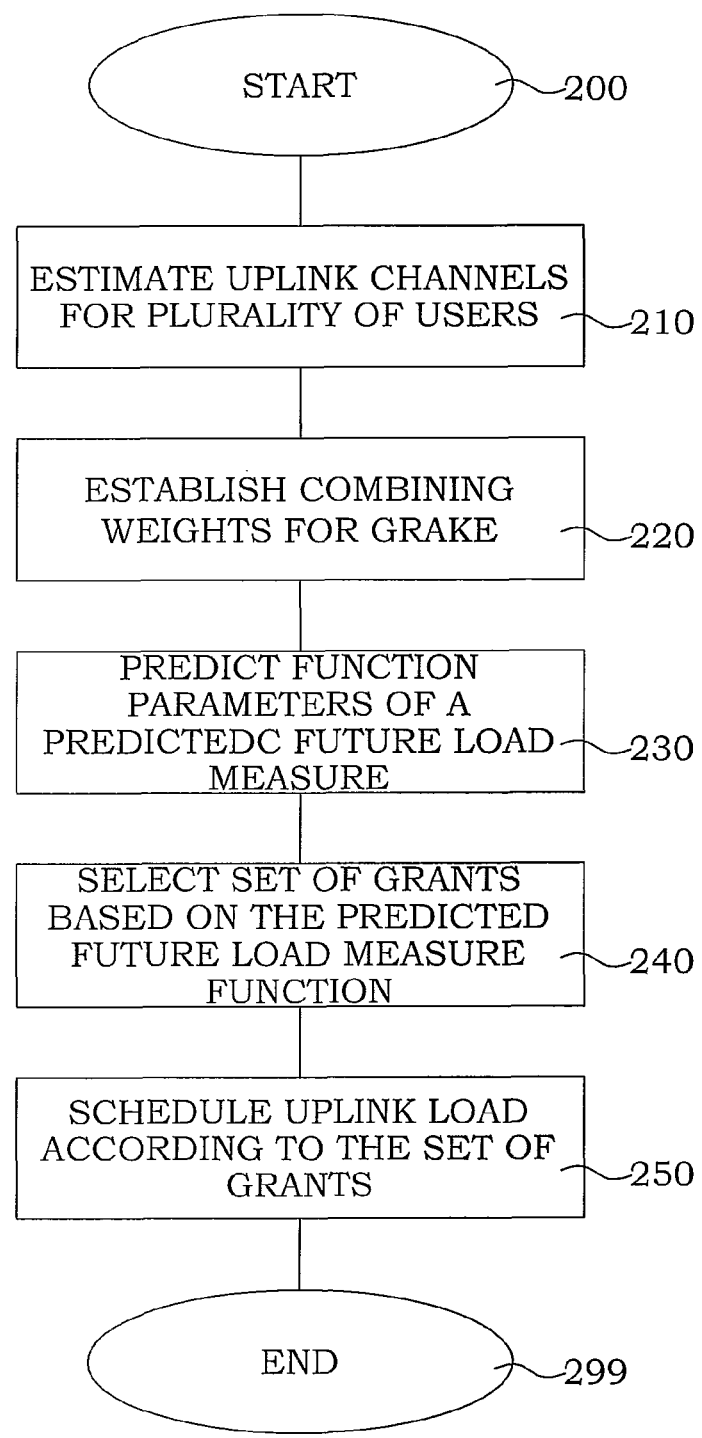
FIG. 4 is a flow diagram of steps of an embodiment of a method for load scheduling.

FIG. 4 is a flow diagram of steps of an embodiment of a method for load scheduling. The procedure for load scheduling in a wideband code division multiple access communication system utilizing GRake equalizing radio reception starts in step 200. In step 210, channel estimates of present received uplink digital radio signals are estimated for a plurality of users. Combining weights for a GRake equalizing reception for the present received uplink digital radio signals are established in step 220. In step 230, function parameters of a predicted future load measure function are predicted. The predicted future load measure function is a function of individual grants of the plurality of users. The predicting of function parameters is based on at least the estimated channel estimates and the established combing weights, taking sensitivity for interference suppression provided by the GRake equalizing for each of the plurality of users into account. The predicting also comprises adapting the predicted function parameters for changed load equilibrium levels caused by the individual grants of the plurality users. The future load measure function is preferably defined as described further above.

In step 240, a set of grants for the users is selected giving a required set of user future loads for the predicted future load measure function defined by the predicted function parameters. The step of selecting a set of grants preferably comprises optimizing of a criterion function that is dependent on the individual grants, and by selecting the individual grants giving the optimization as the set of grants for the users. Furthermore preferred, the optimization is performed under a constraint relation involving the user future loads for the predicted future load measure function of the individual grants. Uplink load is in step 250 scheduling according to the selected set of grants. The procedure ends in step 299.

In preferred embodiments, the method further comprises extrapolating of the channel estimates to a future application time, where the application time is a time when a present uplink load scheduling is assumed to be applied. Likewise, in preferred embodiments, the method further comprises extrapolating of the combining weights to the future application time.

Figure 5:
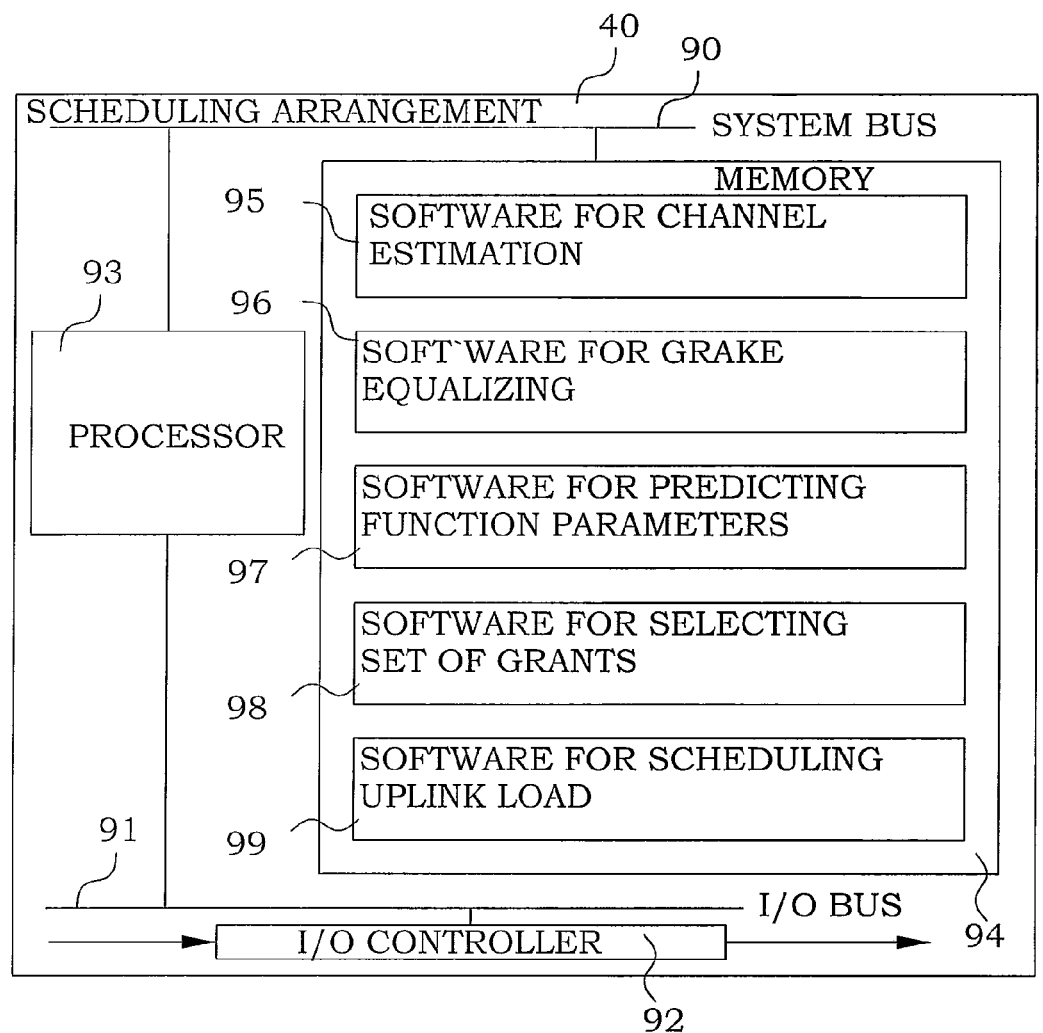
FIG. 5 is a block diagram of an embodiment of a scheduler arrangement.

As an implementation example, FIG. 5 is a block diagram illustrating an example embodiment of a scheduling arrangement 40. This embodiment is based on a processor 93, for example a micro processor, a memory 94, a system bus 90, an input/output (I/O) controller 92 and an I/O bus 91. In this embodiment the received uplink digital radio signals are received by the I/O controller 92 are stored in the memory 94. The I/O controller 92 also controls the issue of the equalized uplink digital radio signals and the scheduled set of grants. The processor 93 executes a software component 95 for performing a channel estimation on the received uplink digital radio signal, and a software component 96 for equalizing the received uplink digital radio signal. The processor 93 executes a software component 97 for predicting function parameters of a predicted future load measure function, a software component 98 for selecting a set of grants, and a software component 99 for scheduling of uplink load. This software is stored in the memory 94. The processor 93 communicates with the memory 94 over the system bus 90. Software component 95 may implement the functionality of block 50 in the embodiment of FIG. 2. Software component 96 may implement the functionality of block 60 in the embodiment of FIG. 2. Software component 97 may implement the functionality of block 70 in the embodiment of FIG. 2. Software component 98 and software component 99 may implement the functionality of block 80 in the embodiment of FIG. 2.

As a summary, by utilizing the ideas of the present disclosures, the interference suppression technique can be utilized properly and the cell capacity and UL cell throughput will be possible to increase.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

APPENDIX A

Load without IC/IS

It is e.g. shown in prior art that without IC/IS, the load at the antenna connector is given by the noise rise, or rise over thermal, RoT(t), defined by $$RoT(t) = \frac{RTWP(t)}{N(t)}, \quad (A1)$$

where N(t) is the thermal noise level as measured at the antenna connector. It remains to define what is meant with RTWP(t). This relative measure is unaffected of any de-spreading applied. The definition used here is simply the Received Total Wideband Power:

$$RTWP(t) = \sum_{k=1}^{K} P_k(t) + I^N(t) + N(t), \quad (A2)$$

also measured at the antenna connector. Here $I^N(t)$ denotes the power as received from neighbor cells $^N$ of the WCDMA system. As will be seen below, the major difficulty of any RoT estimation algorithm is to separate the thermal noise power from the interference from neighbor cells.

Another specific problem that needs to be addressed is that the signal reference points are, by definition at the antenna connectors. The measurements are however obtained after the analogue signal conditioning chain, in the digital receiver. The analogue signal conditioning chain does introduce a scale factor error of about 1 dB (1-sigma) that is difficult to compensate for. Fortunately, all powers of (2) are equally affected by the scale factor error so when (A1) is calculated, the scale factor error is cancelled as $$RoT^{Digital\ Receiver}(t) = \quad (A3)$$

$$\frac{RTWP^{Digital\ Receiver}(t)}{N^{Digital\ Receiver}(t)} = \frac{\gamma(t)RTWP^{Antenna}(t)}{\gamma(t)N^{Antenna}(t)} = RoT^{Antenna}(t).$$

In order to understand the fundamental problem of neighbor cell interference when performing load estimation, note that:

$$I^N(t)+N(t)=E[I^N(t)]+E[N(t)]+\Delta I^N(t)+\Delta N(t), \quad (A4)$$

where E[ ] denotes mathematical expectation and where Δ denotes the variation around the mean. The fundamental problem can now be clearly seen. Since there are no measurements available in the node B that are related to the neighbor cell interference, a linear filtering operation can at best estimate the sum $E[I^N(t)]+E[N(t)]$. This estimate cannot be used to deduce the value of $E[N(t)]$. The situation is the same as when the sum of two numbers is available. Then there is no way to figure out the values of the individual numbers. This issue is analyzed rigorously for the RoT estimation problem in prior art where it is proved that the noise power floor is not mathematically observable.

RoT Estimation Algorithms in Prior Art

Sliding Window Algorithm

One RoT estimation algorithm according to prior art estimates the RoT, as given by (A1). The main problem solved by the estimation algorithm is the accurate estimation of the thermal noise floor $N(t)$. Since it is not possible to obtain exact estimates of this quantity due to the neighbor cell interference, the estimator therefore applies an approximation, by consideration of the soft minimum as computed over a relative long window in time.

It is important to understand that this estimation relies on the fact that the noise floor is constant over very long periods of time (disregarding the small temperature drift).

Recursive Algorithm

The sliding window algorithm of the above section has the disadvantage of requiring a large amount of storage memory. This becomes particularly troublesome in case a large number of instances of the algorithm is needed, as may be the case when IC/IS is introduced in the uplink.

To reduce the memory consumption a recursive algorithm has been disclosed in prior art. That algorithm reduces the memory requirements of the sliding window scheme discussed above at least by a factor of 100.

Cell Stability Oriented Load Estimation Algorithms in Prior Art

Some of the prior art cell stability load estimation functionality, exploits load factors for each user. In their simplest form the load factors are given by $$L_u = \frac{P_u}{RTWP} = \frac{(C/I)_u}{1+(C/I)_u}, u=1, \ldots, U, \tag{A5}$$

where $P_u$ is the power of user u. Load factors are then summed up, for each power controlled user. In this way the neighbor cell interference is not included in the resulting load measure. This is reasonable since the neighbor cell interference should not affect the own cell power control loop, at least not when first order effects are considered.

APPENDIX B

IC with Regeneration and Subtraction

The conventional procedure to perform IC is summarized by the following steps:

- The channel of the interferer to be canceled is estimated. This is anyway needed.
- The transmitted signal of the interferer to be cancelled is decoded. This is anyway needed.
- A replica of the received signal of the interferer to be cancelled is created, by use of the estimated channel and the decoded signal. This replica may e.g. be reconstructed as an IQ chip stream.
- The replica of the interfering signal is subtracted from the received signal of the user to be decoded, thereby hopefully reducing the remaining power of the interferer to very low power levels.

It is important to observe that the effect of this procedure is different for different users, since an interferer is a user on its own. The consequence for load estimation is that there is no longer a uniform way to look on the interference of the WCDMA uplink—the load becomes individual for each user. Hence combining user interference to an uplink cell load is no longer trivial—rather it requires special measures disclosed below.

Finally, note that IC with regeneration and subtraction is more straightforward than with GRake+ (treated below) since there is no change of the scale factor for the thermal noise power floor. The consequence is that the RoT estimation algorithms are still applicable in this case, for each user, since a constant noise power level is estimated.

IS with G-Rake+ and Chip Equalizers

One difference with GRake+ as compared to conventional Rake, is that each user sees a reduced level of interference, immediately after the weight combining step. In GRake+, a covariance matrix $\hat{R}_u$, u=1, ..., U, with the order equal to the number of fingers is first estimated to capture the interference. The spreading codes not used by the present user u may be used in order to estimate $\hat{R}_u$.

The GRake+ receiver uses the estimated covariance matrix that models the interference for computation of the combining weights for the users u, u=1, ..., U.

$$\hat{R}_u \hat{w}_u = \hat{h}_u, u=1, \ldots, U \tag{B1}$$

where $\hat{h}_u$, u=1, ..., U, is the net channel response of user u and where $\hat{w}_u$ are the combining weights.

The effect of (B1) is that GRake+ essentially whitens the correlated interference and removes large spectral peaks from interferers at certain finger locations and for certain antenna elements.

Note that GRake+ is still a linear receiver. There is a related type of IS receiver for WCDMA which is also linear, denoted the chip equalizer. The difference between GRake+ and the chip equalizer is the order of certain basic operations. The consequence is that the present invention is applicable to the chip equalizer as well.

Measurement of Load after IS in G-Rake+ and Chip Equalizers

To see how load can be estimated taking account of the GRake+ IS gain, the powers after weight combining are studied at sufficient statistics level. First, it is assumed that the received signal of user u on code $k \in \Omega_u$ is:

$$y_{u,k}=h_u s_{u,k}+I_{u,k}+N_{u,k}, u=1,\ldots,U, k=1,\ldots,K \tag{B2}$$

where $\Omega_u$ denotes the set of codes for user u, $s_{u,k}$, u=1, ..., U, k=1, ..., K, is the signal, $I_{u,k}$, u=1, ..., U, k=1, ..., K, is the interference and $N_{u,k}$, u=1, ..., U, k=1, ..., K, is the (thermal) noise signal (not power) and $\hat{h}_u$, u=1, ..., U, is the net channel response of user u. GRake+ then performs weight combining to get the sufficient statistics $z_{u,k}^{G+}$ according to the equations:

$$\hat{z}_{u,k}^{G+}=\hat{w}_u^H y_{u,k}=\hat{w}_u^H \hat{h}_u s_{u,k}+\hat{w}_u^H I_{u,k}+\hat{w}_u^H N_{u,k}, u=1,\ldots,U, k=1,\ldots,K. \tag{B3}$$

$$\hat{R}_u \hat{w}_u = \hat{h}_u, u=1, \ldots, U \tag{B4}$$

Here $\hat{w}_u$ are the combining weights of GRake+, whereas the estimated covariance matrix that models the interference for computation of the combining weights for the users u is given by $\hat{R}_u$. Equations (B3) and (B4) have two main implications; one indicating how power measurements can be done and one indicating the scale factor problem which is addressed below.

Using equation (B3) it can be seen that the effect of the GRake+ weight combining is the same as if an artificial received signal $z_{u,k}^{G+}$ would be processed. Since these signals obviously reflect the weight combining and thereby the IS gains of the GRake+ receiver, $z_{u,k}^{G+}$, $u=1, \ldots, U$, $k=1, \ldots, K$, is believed to be a relevant starting point for load estimation.

As stated above, the load estimator operates by processing of the RTWP and in the future possibly the received scheduled enhanced uplink power shared (RSEPS). For this reason, similar power signals need to be formed from the $z_{u,k}^{G+}$, $u=1, \ldots, U$, $k=1, \ldots, K$, in order to reuse the load concept applied without IS.

Note that it is not clear if the proposed approach to reuse the load concept applied without IS is precise or optimal.

User Powers Associated with the GRake+ Sufficient Statistics

Squaring (B3) and assuming a low degree of correlation between its three terms, leads to:

$$|\hat{z}_{u,k}^{G+}|^2 \approx \hat{w}_u^H \hat{h}_u \hat{h}_u^H \hat{w}_u |s_{u,k}|^2 + \hat{w}_u^H I_{u,k} I_{u,k}^H \hat{w}_u + \hat{w}_u^H N_{u,k} N_{u,k}^H \hat{w}_u \equiv S_{u,k}^{G+} + I_{u,k}^{G+} + N_{u,k}^{G+}, u=1, \ldots, U, k=1, \ldots, K. \quad (B5)$$

The rise over thermal, as seen by user u is now, by definition:

$$RoT_u^{G+} \equiv \frac{S_u^{G+} + I_u^{G+} + N_u^{G+}}{N_u^{G+}} \quad (B6)$$

$$S_u^{G+} = \sum_{k \in \Omega_u} S_{u,k}^{G+} \quad (B7)$$

$$I_u^{G+} = \sum_k I_{u,k}^{G+} \quad (B8)$$

$$N_u^{G+} = \sum_k N_{u,k}^{G+}. \quad (B9)$$

Note that it is unclear how to distinguish between $S_{u,k}^{G+}$, $I_{u,k}^{G+}$ and $N_{u,k}^{G+}$ for $k \in \Omega_u$. The algorithm disclosed here avoids many of these problems, since both $I_{u,k}^{G+}$ and $N_{u,k}^{G+}$ are computed from other quantities. Note further that in (B5) $S_{u,k}^{G+} = \hat{w}_u^H \hat{h}_u \hat{h}_u^H \hat{w}_u |s_{u,k}|^2$, i.e. the power is expressed starting with the (transmitted) code power $|s_{u,k}|^2$. The same quantity $S_{u,k}^{G+}$ can also be expressed starting with the antenna power $|e_{u,k}|^2 = \hat{h}_u^H \hat{h}_u |s_{u,k}|^2$, in which case $S_{u,k}^{G+} = \hat{w}_u^H \hat{w}_u |e_{u,k}|^2$. This latter setting is used in the link simulations used for validation of the concept. The algorithmic development that follows does however use the definitions (B5)-(B9).

Computation of $S_u^{G+}$

The signal power is computed directly from (B7). Using (B5) and (B7) then results in:

$$S_u^{G+} = \sum_{k \in \Omega_u} S_{u,k}^{G+} \quad (B10)$$

$$= \hat{w}_u^H \hat{h}_u \hat{h}_u^H \hat{w}_u \sum_{k \in \Omega_u} |s_{u,k}|^2$$

$$= \hat{w}_u^H \hat{h}_u \hat{h}_u^H \hat{w}_u \hat{E}_{s,u}$$

$$= |\hat{w}_u^H \hat{h}_u|^2 \hat{E}_{s,u},$$

$$u = 1, \ldots, U.$$

Note that computation of the signal energy $\hat{E}_{s,u}$ is quite intricate, including e.g. the involved beta factors.

Computation of $N_u^{G+}$

White Noise Power Floor

The idea here is to rely on the baseline thermal noise power floor estimation algorithm to estimate the thermal noise power floor before any GRake+ processing. A main problem then arises since the thermal noise is scaled by $\hat{w}_u$ when the sufficient statistics is evaluated. This means that the thermal noise power level will no longer appear constant.

The approach taken here to circumvent this problem builds on the calculation of the scale factor by which the thermal noise power is scaled. To compute this quantity, first note that when the wideband thermal noise power floor is estimated before GRake+ processing, e.g. with the baseline noise floor estimator, the following quantity is estimated:

$$\hat{N} = \frac{1}{M} \sum_{m=1}^{M} \sum_{k=1}^{K} (N_{u,k}^m)^H N_{u,k}^m \underset{M \to \infty}{\longrightarrow} KE[(N_{u,k})^H N_{u,k}] \quad (B11)$$

$$= K P_{N_{u,k}}$$

$$= K \frac{1}{K} P_N$$

$$= N_0,$$

where $N_0$ is the thermal noise power floor and where m is the sample summation index. The power at the sufficient statistics signal processing point is however:

$$\hat{N}^{G+} = \frac{1}{M} \sum_{m=1}^{M} \sum_{k=1}^{K} (\hat{w}_u^H N_{u,k}^m)^H \hat{w}_u^H N_{u,k}^m \quad (B12)$$

$$= \frac{1}{M} \sum_{m=1}^{M} \sum_{k=1}^{K} tr((\hat{w}_u^H N_{u,k}^m)^H \hat{w}_u^H N_{u,k}^m)$$

$$= \frac{1}{M} \sum_{m=1}^{M} \sum_{k=1}^{K} tr(\hat{w}_u^H N_{u,k}^m (\hat{w}_u^H N_{u,k}^m)^H)$$

$$= \frac{1}{M} \sum_{m=1}^{M} \sum_{k=1}^{K} tr(\hat{w}_u^H N_{u,k}^m (N_{u,k}^m)^H \hat{w}_u)$$

$$= tr\left(\sum_{k=1}^{K} \hat{w}_u^H \left(\frac{1}{M} \sum_{m=1}^{M} N_{u,k}^m (N_{u,k}^m)^H\right) \hat{w}_u\right)_{M \to \infty}$$

$$tr(K \hat{w}_u^H E[N_{u,k}(N_{u,k})^H] \hat{w}_u)$$

$$= tr(K \hat{w}_u^H (N_0/K) I \hat{w}_u)$$

$$= \hat{w}_u^H \hat{w}_u N_0$$

$$= \hat{w}_u^H \hat{w}_u \hat{N}.$$

The conclusion is that the thermal noise floor at the sufficient statistics signal point can be obtained from the noise floor estimate before GRake+ processing, by a multiplication with the scale factor:

$$k_u^{G+} = (\hat{w}_u)^H \hat{w}_u, u=1, \ldots, U. \quad (B13)$$

This gives:

$$N_u^{G+} = k_u^{G+} \hat{N}, u=1, \ldots, U. \quad (B14)$$

The computation of the scale factor requires an additional inner product for each user.

Colored Noise Power Floor

This subsection discusses the case where the result of (B11) is replaced by the more general assumption:

$$\frac{1}{M}\sum_{m=1}^{M}\sum_{k=1}^{K}N_{u,k}^{m}(N_{u,k}^{m})^{H} \underset{M\to\infty}{\to} KE[N_{u,k}(N_{u,k})^{H}] = K\frac{N_{0}}{K}R_{N} = N_{0}R_{N}, \quad (B15)$$

i.e. the case when sampling is fast enough to reflect the shape of the uplink spectrum. In this case it follows that (B11) is transformed to:

$$\hat{N} = \frac{1}{M}\sum_{m=1}^{M}\sum_{k=1}^{K}(N_{u,k}^{m})^{H}N_{u,k}^{m} \underset{M\to\infty}{\to} KE[(N_{u,k})^{H}N_{u,k}] \quad (B16)$$

$$= Ktr(E[N_{u,k}(N_{u,k})^{H}])$$

$$= N_{0}tr(R_{N})$$

Furthermore, (B12) is transformed into $$\hat{N}^{G+} = N_0 tr(\hat{w}_u^H R_N \hat{w}_u). \quad (B17)$$

The end result in this case is the scale factor:

$$\kappa_u^{G+} = \frac{tr(\hat{w}_u^H R_N \hat{w}_u)}{tr(R_N)}. \quad (B18)$$

Computation of $I_u^{G+}$ Using Available SINRs

The code power to interference ratio is:

$$(C/I)_u^{G+} = \frac{S_u^{G+}}{I_u^{G+} + N_u^{G+}}, u = 1, \ldots, U. \quad (B19)$$

It can be noted that in (B19), all quantities except $I_u^{G+}$ have been computed, see (B12) and (B14). Using these quantities, (B19) can be solved for $I_u^{G+}$, giving:

$$I_u^{G+} = \frac{S_u^{G+}}{(C/I)_u^{G+}} - \kappa_u^{G+}\hat{N}, u = 1, \ldots, U. \quad (B20)$$

The quantity $(C/I)_u^{G+}$ can be directly related to SINR. This is performed as:

$$(C/I)_u^{G+} = \frac{(\beta_{u,DPCCH}^2 + \beta_{u,EDPCCH}^2 + n_{u,codes}\beta_{u,EDPDCH}^2)}{\beta_{u,DPCCH}^2 SF_{u,DPCCH}} SINR_u^{G+} = \quad (B21)$$

$$\frac{\beta_{u,effective}^2}{SF_{u,DPCCH}} SINR_u^{G+},$$

which gives:

$$I_u^{G+} = \frac{S_u^{G+}}{(C/I)_u^{G+}} - \kappa_u^{G+}\hat{N} = \frac{SF_{u,DPCCH}}{\beta_{u,effective}^2} \frac{S_u^{G+}}{SINR_u^{G+}} - \kappa_u^{G+}\hat{N} \quad (B22)$$

Computation of $RoT_u^{G+}$

When (B10), (B14) and (B22) are inserted in (B6), the end result becomes:

$$RoT_u^{G+} \equiv \frac{S_u^{G+} + I_u^{G+} + \kappa_u^{G+}\hat{N}}{\kappa_u^{G+}N} = \frac{S_u^{G+}}{\kappa_u^{G+}\hat{N}}\left(1 + \frac{SF_{u,DPCCH}}{\beta_{u,effective}^2}\frac{1}{SINR_u^{G+}}\right), \quad (B23)$$

$$u = 1, \ldots, U.$$

These measures, for each user, are then combined into an uplink measure as outlined below. Note that (B23) provides some interesting insights. When SINR is high then the RoT for the user is essentially determined by the remaining own power of the user—the RoT then increases when the SINR gets worse.

Computation of RTWP and RSEPS Equivalents

The computation of the equivalent of RTWP and RSEPS power, at the sufficient statistics signal point, is discussed next. It follows from (B23) that the equivalent of RTWP, seen by user u, becomes:

$$S_{u,RTWP}^{G+} = S_u^{G+}\left(1 + \frac{SF_{u,DPCCH}}{\beta_{u,effective}^2}\frac{1}{SINR_u^{G+}}\right), u = 1, \ldots, U. \quad (B24)$$

The equivalent of RSEPS, as seen by user u, is therefore obtained by a summation over the RSEPS user codes, when still using $\hat{h}_u$ and $\hat{w}_u$:

$$S_{u,RSEPS}^{G+} = \sum_{u_{RSEPS}=1}^{U_{RSEPS}} S_{u(u_{RSPES})}^{G+}, u = 1, \ldots, U \quad (B25)$$

$$S_{u(u_{RSEPS})}^{G+} = \sum_{k\in\Omega_{u(u_{RSEPS})}} S_{u,k}^{G+} = \hat{w}_u^H \hat{h}_u \hat{h}_u^H \hat{w}_u \sum_{k\in\Omega_{u(u_{RSEPS})}} |s_{u,k}|^2 \quad (B26)$$

$$= \hat{w}_u^H \hat{h}_u \hat{h}_u^H \hat{w}_u \hat{E}_{s,u(u_{RSPES})} = |\hat{w}_u^H \hat{h}_u|^2 \hat{E}_{s,u(u_{RSEPS})},$$

$$u_{RSEPS} = 1, \ldots, U_{RSEPS}.$$

Note again that the channel model of user u is retained when summing over the codes of the RSEPS users. Hence the computation needs to be performed once for each user.

Uplink Load Measures for GRake+

Averaged Load Measure

Averaging over all users using (B23), gives the uplink load measure:

$$\langle RoT^{G+}\rangle = \frac{1}{U}\sum_{u=1}^{U} RoT_u^{G+}. \quad (B27)$$

This measure may not be suitable since it does not capture the effect of users with poor IS gain, these users being more likely to cause instability by power increases. Similarly, the averaged RTWP and RSEPS measures become:

$$\langle S_{RTWP}^{G+}\rangle = \frac{1}{U}\sum_{u=1}^{U} S_{u,RTWP}^{G+} \quad (B28)$$

$$\langle S_{RSEPS}^{G+} \rangle = \frac{1}{U} \sum_{u=1}^{U} S_{u,RSEPS}^{G+}. \quad (B29)$$

Worst Case Load Measure

Rather than performing averaging a worst case approach may therefore be taken, where the averaging is replaced by a maximum operation. This means that the user that sees the maximum total load is used for load estimation purposes. This conservative approach could hence be motivated by cell stability arguments—however it may also be too conservative. The worst case load is defined by the equations:

$$u_{max} = \underset{u}{\operatorname{argmax}}(RoT_u^{G+}) \quad (B30)$$

$$\max(RoT_u^{G+}) = RoT_{u_{max}}^{G+} \quad (B31)$$

$$\max(S_{RTWP}^{G+}) = S_{u_{max},RTWP}^{G+} \quad (B32)$$

$$\max(S_{RSEPS}^{G+}) = S_{u_{max},RSEPS}^{G+} \quad (B33)$$

Outage Interference Measure

A third alternative would be to sort the $RoT_u^{G+}$ and then select the user corresponding to a selected percentile.

APPENDIX C

Reformulation of the Measured RoT Per User

In order to formulate the mathematical problem associated with the invention, the equation giving the RoT per user needs to be reformulated. Towards this end, note that (26) gives $$\beta_{u,effective}^2 = 1 + \frac{\beta_{u,EDPCCH}^2 + n_{u,codes}\beta_{u,EDPDCH}^2}{\beta_{u,DCPCCH}^2} \equiv 1 + \gamma_u, \quad (C1)$$

$$u = 1, \ldots, U.$$

Using (B10), (B13) and (C1) in (B23) gives the following expression for the RoT per user $$RoT_u^{G+} \equiv \frac{S_u^{G+} + I_u^{G+} + \kappa_u^{G+}\hat{N}}{\kappa_u^{G+}\hat{N}} = \quad (C2)$$

$$\frac{|\hat{w}_u^H \hat{h}_u|^2 E_{S,u}}{\hat{w}_u^H \hat{w}_u \hat{N}}\left(1 + \frac{SF_{u,DPCCH}}{1+\gamma_u}\frac{1}{SINR_u^{G+}}\right),$$

$$u = 1, \ldots, U.$$

This expression depends on the channel $\hat{h}_u$, the combining weights $\hat{w}_u$, the total transmitted power from the UE $E_{S,u}$, the noise floor $\hat{N}$, a spreading factor $SF_{u,DPCCH}$, the granted data power $\gamma_u$, and the SINR $SINR_u^{G+}$, for the user at hand. Note that the hat has been removed from $E_{S,u}$ since the objective is not to estimate but to compute this quantity for scheduling purposes. It can be noted that the total transmit power of the UE is $$E_{S,u} = (1+\gamma_u)P_{u,DPCCH}(\gamma), u=1, \ldots, U, \quad (C3)$$

which results in the following expression when inserted in (C2):

$$RoT_u^{G+} = \frac{|\hat{w}_u^H \hat{h}_u|^2 P_{u,DPCCH}(\gamma)}{\hat{w}_u^H \hat{w}_u \hat{N}}\left(1 + \gamma_u + SF_{u,DPCCH}\frac{1}{SINR_u^{G+}}\right), \quad (C4)$$

$$u = 1, \ldots, U.$$

The expression (C4) puts the development in a position to couple the RoT to the grants, using the power control loop. Note that the nonlinear coupling of the Inner Loop Power Control (ILPC) makes the Dedicated Physical Control CHannel (DPCCH) transmit power of a UE depend on the grant of all users ($\gamma$). The grant vector is defined by (C25) below.

Interference Power after Interference Suppression

In order to come up with an expression for the interference power after GRAKE+ processing ($I_{u,neighbor}^{G+}$) the simplifying assumption that the interference can be treated as generated by a white noise process is necessary.

Using this assumption the interference power after G-rake+ processing can be treated as the thermal noise power floor, resulting in:

$$\hat{I}_u^{G+} = \frac{1}{M}\sum_{m=1}^{M}\sum_{k=1}^{K}\left(\hat{w}_u^H I_{u,k}^m\right)^H \hat{w}_u^H I_{u,k}^m \quad (C5)$$

$$= \frac{1}{M}\sum_{m=1}^{M}\sum_{k=1}^{K} tr\left(\left(\hat{w}_u^H I_{u,k}^m\right)^H \hat{w}_u^H I_{u,k}^m\right)$$

$$= \frac{1}{M}\sum_{m=1}^{M}\sum_{k=1}^{K} tr\left(\hat{w}_u^H I_{u,k}^m \left(\hat{w}_u^H I_{u,k}^m\right)^H\right)$$

$$= \frac{1}{M}\sum_{m=1}^{M}\sum_{k=1}^{K} tr\left(\hat{w}_u^H I_{u,k}^m (I_{u,k}^m)^H \hat{w}_u\right)$$

$$= tr\left(\sum_{k=1}^{K}\hat{w}_u^H \left(\frac{1}{M}\sum_{m=1}^{M} I_{u,k}^m (I_{u,k}^m)^H\right)\hat{w}_u\right)$$

$$\xrightarrow{M\to\infty} tr\left(\hat{w}_u^H E[I_u(I_u)^H]\hat{w}_u\right)$$

$$= tr\left(\hat{w}_u^H (\hat{I}_u)\hat{w}_u\right)$$

$$= \hat{w}_u^H \hat{w}_u \hat{I}_u.$$

$$u = 1, \ldots, U.$$

Since the objective again is computations involving the interference power, the hats are removed, resulting in:

$$I_u^{G+} = w_u^H w_u I_u, u=1, \ldots, U. \quad (C6)$$

ILPC, RoT and Grants

The assumption of this development is that the inner loop power control loop is closed after G-rake+ processing and that the control objective is to keep the $SINR_u^{G+}$ at the target value $SINR_{u,reference}^{G+}$. The target value can be considered constant since it changes slower than both grants and ILPC quantities. Define the following vector and matrix quantities:

$$P_{DPCCH}^{G+} = (P_{1,DPCCH}^{G+} \ldots P_{U,DPCCH}^{G+})^T, \quad (C7)$$

$$P_{DPCCH} = (P_{1,DPCCH} \ldots P_{U,DPCCH})^T, \quad (C8)$$

-continued $$I^{G+} = (I_1^{G+} \ldots I_U^{G+})^T, \quad (C9)$$

$$I = (I_1 \ldots I_U)^T, \quad (C10)$$

$$\hat{N}^{G+} = (1 \ldots 1)^T \hat{N}^{G+}, \quad (C11)$$

$$\hat{N} = (1 \ldots 1)^T \hat{N}, \quad (C12)$$

$$SINR^{G+} = \begin{pmatrix} SINR_1^{G+} & 0 & 0 \\ 0 & \ddots & 0 \\ 0 & 0 & SINR_U^{G+} \end{pmatrix}, \quad (C13)$$

$$SINR_{reference}^{G+} = \begin{pmatrix} SINR_{1,reference}^{G+} & 0 & 0 \\ 0 & \ddots & 0 \\ 0 & 0 & SINR_{U,reference}^{G+} \end{pmatrix}, \quad (C14)$$

$$SF_{DPCCH} = \begin{pmatrix} SF_{1,DPCCH} & 0 & 0 \\ 0 & \ddots & 0 \\ 0 & 0 & SF_{U,DPCCH} \end{pmatrix} \quad (C15)$$

$$W_{|w|^2} = \begin{pmatrix} w_1^H w_1 & 0 & 0 \\ 0 & \ddots & 0 \\ 0 & 0 & w_U^H w_U \end{pmatrix}, \quad (C16)$$

$$W_{|w^H h|^2} = \begin{pmatrix} |w_1^H h_1| & 0 & 0 \\ 0 & \ddots & 0 \\ 0 & 0 & |w_U^H h_U|^2 \end{pmatrix}. \quad (C17)$$

It then follows from the definitions of C/I (B20), and SINR (B21), and (C1) that:

$$I^{G+} = SF_{DPCCH}(SINR^{G+})^{-1} P_{DPCCH}^{G+} - \hat{N}^{G+}. \quad (C18)$$

Noting that (B10) shows that $$P_{DPCCH}^{G+} = W_{w^H h|^2} P_{DPCCH}, \quad (C19)$$

and that (B12) and (C6) imply:

$$\hat{N}^{G+} = W_{|w|^2} \hat{N}, \quad (C20)$$

$$I^{G+} = W_{|w|^2} I. \quad (C21)$$

Using the fact that the ILPC is assumed to operate correctly, i.e. that the SINR operating point equals the SINR reference and the fact that the loop is closed after G-rake+ processing, it follows that:

$$I = W_{|w|^2}^{-1} SF_{DPCCH}(SINR_{reference}^{G+})^{-1} W_{|w^H h|^2} P_{DPCCH} - \hat{N}. \quad (C22)$$

It remains to relate the interference to the powers, to compute the equilibrium solution. Towards that end, it is noted that before the receiver:

$$I = R(\gamma) H_{|h|^2} P_{DPCCH}, \quad (C23)$$

where $$R(\gamma) = \begin{pmatrix} \alpha_1(1+\gamma_1) & 1+\gamma_2 & 1+\gamma_3 & \ldots & 1+\gamma_U \\ 1+\gamma_1 & \alpha_2(1+\gamma_2) & 1+\gamma_3 & \ldots & 1+\gamma_U \\ 1+\gamma_1 & 1+\gamma_2 & \alpha_3(1+\gamma_3) & \ldots & 1+\gamma_U \\ \vdots & \vdots & \vdots & \ddots & \vdots \\ 1+\gamma_1 & 1+\gamma_2 & 1+\gamma_3 & \ldots & \alpha_U(1+\gamma_U) \end{pmatrix}, \quad (C24)$$

$$\gamma = (\gamma_1 \ldots \gamma_U)^T, \quad (C25)$$

-continued $$H_{|h|^2} = \begin{pmatrix} |h_1|^2 & 0 & 0 \\ 0 & \ddots & 0 \\ 0 & 0 & |h_U|^2 \end{pmatrix}. \quad (C26)$$

Above, $\alpha_u$, $u=1, \ldots, U$, denotes the self interference factors. Inserting (C23) into (C22) renders the following equation for the transmit powers:

$$R(\gamma) H_{|h|^2} P_{DPCCH} = W_{|w|^2}^{-1} SF_{DPCCH} \\ (SINR_{reference}^{G+})^{-1} W_{|w^H h|^2} P_{DPCCH} - \hat{N}. \quad (C27)$$

The solution is:

$$P_{DPCCH} = (W_{|w|^2}^{-1} SF_{DPCCH}(SINR_{reference}^{G+})^{-1} \\ W_{|w^H h|^2} - R(\gamma) H_{|h|^2})^{-1} \hat{N}. \quad (C28)$$

With the DPCCH transmit powers computed in (C28), the RoT computation can be finalized by insertion of (C28) in a vectorized version of (C4). It is easy to see that the vectorized version of (C4) can be written as:

$$RoT^{G+}(\gamma) = \quad (C29)$$

$$\frac{1}{\hat{N}} W_{|w^H h|^2} W_{|w|^2}^{-1} (I + \text{diag}(\gamma) + SF_{DPCCH}(SINR_{reference}^{G+})^{-1}) P_{DPCCH},$$

where I is the identity matrix, and where:

$$\text{diag}(\gamma) = \begin{pmatrix} \gamma_1 & 0 & 0 \\ 0 & \ddots & 0 \\ 0 & 0 & \gamma_U \end{pmatrix}, \quad (C30)$$

$$SF_{DPCCH} = \begin{pmatrix} SF_{1,DPCCH} & 0 & 0 \\ 0 & \ddots & 0 \\ 0 & 0 & SF_{U,DPCCH} \end{pmatrix}. \quad (C31)$$

Combining (C12), (C28) and (C29) results in:

$$RoT^{G+}(\gamma) = W_{|w^H h|^2} W_{|w|^2}^{-1}(I+\text{diag}(\gamma)+SF_{DPCCH} \\ (SINR_{reference}^{G+})^{-1}) \cdot (W_{|w|^2}^{-1} SF_{DPCCH} \\ (SINR_{reference}^{G+})^{-1} W_{|w^H h|^2} - R(\gamma) H_{|h|^2})^{-1} 1, \quad (C32)$$

where 1 is a vector of ones, c.f. (C12). As can be seen the RoT is a nonlinear function of the grants.

APPENDIX D

Example 1 of Scheduling Calculations

The formulation of the problem to be solved:

Maximize the sum of the granted powers (these are approximately proportional to the bit rates), while keeping the pre-scribed RoT.

This is expressed as:

$$\max_{\gamma}(\text{trace}(\text{diag}(\gamma))), \quad (D1)$$

subject to:

$$RoT^{G+}(\gamma) = W_{|w^H h|^2} W_{|w|^2}^{-1}(I+\text{diag}(\gamma)+SF_{DPCCH} \\ (SINR_{reference}^{G+})^{-1}) \cdot (W_{|w|^2}^{-1} SF_{DPCCH} \\ (SINR_{reference}^{G+})^{-1} W_{|w^H h|^2} - R(\gamma) H_{|h|^2})^{-1} 1 \leq \\ RoT_{max}^{G+} 1 \quad (D2)$$

To solve the problem (D1)-(D2) standard algorithms from optimization theory, see e.g. D. G. Luenberger, Linear and Nonlinear Programming, 2:nd ed., Addison Wesley, 1984, can be used. The problem (D1)-(D2) is a problem with a linear criterion, subject to a nonlinear inequality constraint. Such problems can e.g. be solved by techniques detailed in the book by Luenberger. Examples include the active set method (section 11.3), the gradient projection method (section 11.4), the barrier method (section 12.2) and the cutting plane method (section 13.6).

Example 2 of Scheduling Calculations

The formulation of the problem to be solved:

Select the granted powers (these are approximately proportional to the bit rates) so that the RoT for all users achieve the maximum RoT. The all users are worst case users which should represent a case with high bit rates.

This is expressed as:

$$\text{RoT}^{G+}(\gamma) = W_{|w_h|^2} W_{|w|^2}^{-1} (I + \text{diag}(\gamma) + SF_{DPCCH}$$
$$(\text{SINR}_{reference}^{G+})^{-1}) \cdot (W_{|w|^2}^{-1} SF_{DPCCH}$$
$$(\text{SINR}_{reference}^{G+})^{-1} W_{|w_h|^2} - R(\gamma) H_{|h|^2})^{-1} 1 =$$
$$\text{RoT}_{max}^{G+1} \quad \text{(D3)}$$

To solve the problem (D3), a system of nonlinear equations needs to be solved for $\gamma$. Again the book by Luenberger advices many methods, e.g. the steepest descent and the Newton method, see sections 7.6 and 7.8, respectively.

ABBREVIATIONS

CQI Channel Quality Indicator
DL DownLink
DPCCH Dedicated Physical Control CHannel
EUL Enhanced UpLink
GRake Generalized Rake
IC Interference Cancellation
ILPC Inner Loop Power Control
I/O Input/output
IS Interference Suppression
RoT Rise-over-Thermal
RSEPS Received Scheduled Enhanced uplink Power Shared
RTWP Received Total Wideband Power
SINR Signal-to-Interference-and-Noise Ratio
UE User Equipment
UL UpLink
WCDMA Wideband Code Division Multiple Access

The invention claimed is:

1. A method for load scheduling in a wideband code division multiple access communication system utilizing Generalized Rake (GRake) equalizing radio reception on an uplink, said method comprising:
   estimating channel estimates of present received uplink digital radio signals from a plurality of users;
   calculating combining weights based on the channel estimates for GRake equalizing reception of said present received uplink digital radio signals;
   predicting function parameters of a predicted future load measure function based on at least said channel estimates and said combining weights, wherein said predicted future load measure function is a function of individual grants to be made to said users for a future scheduling time;
   adapting said predicted function parameters for changed load equilibrium levels caused by said individual grants of said users;
   selecting a set of grants to be made to the users for said future scheduling time that gives a required set of user future loads for said predicted future load measure function; and
   scheduling uplink load according to said selected set of grants.

2. The method according to claim 1, further comprising extrapolating said channel estimates to a future application time, said future application time being a future time when a present uplink load scheduling is to be applied.

3. The method according to claim 1, further comprising extrapolating said combining weights to a future application time, said future application time being a future time when a present uplink load scheduling is to be applied.

4. The method according to claim 1, wherein selecting the set of grants comprises optimizing a criterion function that is dependent on said individual grants, and selecting the individual grants achieving said optimization as said set of grants for the users.

5. The method according to claim 4, wherein said optimization is performed under a constraint relation involving said user future loads for said predicted future load measure function of individual grants.

6. The method according to claim 1, wherein said predicted future load measure function is defined as:

$$\text{RoT}^{G+}(\gamma) = W_{|w_h|^2} W_{|w|^2}^{-1} (I + \text{diag}(\gamma) + SF_{DPCCH}$$
$$(\text{SINR}_{reference}^{G+})^{-1}) \cdot (W_{|w|^2}^{-1} SF_{DPCCH}$$
$$(\text{SINR}_{reference}^{G+})^{-1} W_{|w_h|^2} - R(\gamma) H_{|h|^2})^{-1} 1;$$

where function parameter $W_{|w_h|^2}$ is a diagonal matrix with diagonal elements of $|w_n^H h_n|^2$, $n=1 \ldots U$, where U is the number of said plurality of users, $w_n$ is the combining weight of user n, $h_n$ is the channel estimate of user n;

where function parameter $W_{|w|^2}$ is a diagonal matrix with diagonal elements of $w_n^H w_n$, $n=1 \ldots U$;

where I is the identity matrix;

where $\text{diag}(\gamma)$ is a diagonal matrix with the individual grants $\gamma_n$, $n=1 \ldots U$ of said plurality of users as diagonal elements;

where $\gamma$ is a vector of the individual grants $\gamma_n$, $n=1 \ldots U$;

where function parameter $SF_{DPCCH}$ is a diagonal matrix with the scrambling factors of a dedicated physical control channel of said plurality of users as diagonal elements;

where function parameter $\text{SINR}_{reference}^{G+}$ is a reference signal to interference and noise ratio after application of GRake equalizing for said plurality of users as diagonal elements;

where:

$$R(\gamma) = \begin{pmatrix} \alpha_1(1+\gamma_1) & 1+\gamma_2 & 1+\gamma_3 & \ldots & 1+\gamma_U \\ 1+\gamma_1 & \alpha_2(1+\gamma_2) & 1+\gamma_3 & \ldots & 1+\gamma_U \\ 1+\gamma_1 & 1+\gamma_2 & \alpha_3(1+\gamma_3) & \ldots & 1+\gamma_U \\ \vdots & \vdots & \vdots & \ddots & \vdots \\ 1+\gamma_1 & 1+\gamma_2 & 1+\gamma_3 & \ldots & \alpha_U(1+\gamma_U) \end{pmatrix},$$

where function parameters $\alpha_n$, $n=1 \ldots U$ are self interference factors of said plurality of users;

where function parameter $H_{|h|^2}$ is a diagonal matrix with diagonal elements of $|h_n|^2$, $n=1 \ldots U$; and where 1 is a vector of ones.

7. A scheduler arrangement in a wideband code division multiple access communication system utilizing Generalized Rake (GRake) equalizing radio reception on an uplink, said scheduler arrangement comprising:
   a processing circuit comprising:
      a channel estimator configured to estimate channel estimates of present received uplink digital radio signals from a plurality of users;

an equalizer configured to calculate combining weights based on the channel estimates for GRake equalizing reception of said present received uplink digital radio signals;

a predictor that is connected to said channel estimator and said equalizer, and that is configured to:

predict function parameters of a predicted future load measure function based on at least said channel estimates and said combining weights, wherein said predicted future load measure function is a function of individual grants to be made to said users for a future scheduling time; and adapt said predicted function parameters for changed load equilibrium levels caused by said individual grants of said users; and a scheduler that is connected to said predictor and that is configured to:

select a set of grants for the users that gives a required set of user future loads for said predicted future load measure function defined by said predicted function parameters; and schedule uplink load according to said selected set of grants.

8. The scheduler arrangement according to claim 7, wherein said predictor is further configured to extrapolate said channel estimates to a future application time, said future application time being a future time when a present uplink load scheduling is to be applied.

9. The scheduler arrangement according to claim 7, wherein said predictor is further configured to extrapolate said combining weights to a future application time, said future application time being a future time when a present uplink load scheduling is to be applied.

10. The scheduler arrangement according to claim 7, wherein said scheduler is further configured to optimize a criterion function that is dependent on said individual grants, and to select the individual grants achieving said optimization as said set of grants for the users.

11. The scheduler arrangement according to claim 10, wherein said scheduler is further configured to perform said optimization under a constraint relation involving said user future loads for said predicted future load measure function of individual grants.

12. The scheduler arrangement according to claim 7, wherein said predictor is configured to use said predicted future load measure function defined as:

$$RoT^{G+}(\gamma) = W_{|w|^2 H_{|h|^2}} W_{|w|^2}{}^{-1}(I + \text{diag}(\gamma) + SF_{DPCCH}$$
$$(SINR_{reference}{}^{G+})^{-1}) \cdot (W_{|w|^2}{}^{-1} SF_{DPCCH}$$
$$(SINR_{reference}{}^{G+})^{-1} W_{|w|^2 H_{|h|^2}} - R(\gamma) H_{|h|^2})^{-1} 1;$$

where function parameter $W_{|w|^2 H_{|h|^2}}$ is a diagonal matrix with diagonal elements of $w_n{}^H h_n|^2$, n=1 ... U, where U is the number of said plurality of users, $w_n$ is the combining weight of user n, $h_n$ is the channel estimate of user n;

where function parameter $W_{|w|^2}$ is a diagonal matrix with diagonal elements of $w_n{}^H w_n$, n=1 ... U;

where I is the identity matrix;

where $\text{diag}(\gamma)$ is a diagonal matrix with the individual grants $\gamma_n$, n=1 ... U of said plurality of users as diagonal elements;

where $\gamma$ is a vector of the individual grants $\gamma_n$, n=1 ... U;

where function parameter $SF_{DPCCH}$ is a diagonal matrix with the scrambling factors of a dedicated physical control channel of said plurality of users as diagonal elements;

where function parameter $SINR_{reference}{}^{G+}$ is a reference signal to interference and noise ratio after application of GRake equalizing for said plurality of users as diagonal elements;

where:

$$R(\gamma) = \begin{pmatrix} \alpha_1(1+\gamma_1) & 1+\gamma_2 & 1+\gamma_3 & \ldots & 1+\gamma_U \\ 1+\gamma_1 & \alpha_2(1+\gamma_2) & 1+\gamma_3 & \ldots & 1+\gamma_U \\ 1+\gamma_1 & 1+\gamma_2 & \alpha_3(1+\gamma_3) & \ldots & 1+\gamma_U \\ \vdots & \vdots & \vdots & \ddots & \vdots \\ 1+\gamma_1 & 1+\gamma_2 & 1+\gamma_3 & \ldots & \alpha_U(1+\gamma_U) \end{pmatrix},$$

where function parameter $\alpha_n$, n=1 ... U are self interference factors of said plurality of users;

where function parameter $H_{|h|^2}$ is a diagonal matrix with diagonal elements of $|h_n|^2$, n=1 ... U; and where 1 is a vector of ones.

13. A node B in a wideband code division multiple access communication system utilizing Generalized Rake (GRake) equalizing radio receivers on an uplink, said node B comprising:

a processing circuit comprising:

a channel estimator configured to estimate channel values of present received uplink digital radio signals from a plurality of users;

an equalizer configured to calculate combining weights based on the channel estimates for GRake equalizing reception of said present received uplink digital radio signals;

a predictor that is connected to said channel estimator and said equalizer, and that is configured to:

predict function parameters of a predicted future load measure function based on at least said channel estimates and said combing weights, wherein said predicted future load measure function is a function of individual grants to be made to said users for a future scheduling time; and adapt said predicted function parameters for changed load equilibrium levels caused by said individual grants of said users; and a scheduler that is connected to said predictor and that is configured to:

select a set of grants for the users that gives a required set of user future loads for said predicted future load measure function defined by said predicted function parameters; and schedule uplink load according to said selected set of grants.

14. The node B according to claim 13, wherein said predictor is further configured to extrapolate said channel estimates to a future application time, said future application time being a future time when a present uplink load scheduling is to be applied.

15. The node B according to claim 13, wherein said predictor is further configured to extrapolate said combining weights to a future application time, said future application time being a future time when a present uplink load scheduling is to be applied.

16. The node B according to claim 13, wherein said scheduler is further configured to optimize a criterion function that is dependent on said individual grants, and to select the individual grants achieving said optimization as said set of grants for the users.

17. The node B according to claim 16, wherein said scheduler is further configured to perform said optimization under a constraint relation involving said user future loads for said predicted future load measure function of individual grants.

18. The node B according to claim 13, wherein said predictor is configured to use said predicted future load measure function defined as:

$$\text{RoT}^{G+}(\gamma) = W_{|w_Hh|^2} W_{|w|^2}^{-1} (I + \text{diag}(\gamma) + SF_{DPCCH} (\text{SINR}_{reference}^{G+})^{-1}) \cdot (W_{|w|^2}^{-1} SF_{DPCCH} (\text{SINR}_{reference}^{G+})^{-1} W_{|w_Hh|^2} - R(\gamma) H_{|h|^2})^{-1} \mathbf{1};$$

where function parameter $W_{|w_Hh|^2}$ is a diagonal matrix with diagonal elements of $|w_n^H h_n|^2$, $n=1 \ldots U$, where U is the number of said plurality of users, $w_n$ is the combining weight of user n, $h_n$ is the channel estimate of user n;

where function parameter $W_{|w|^2}$ is a diagonal matrix with diagonal elements of $w_n^H w_n$, $n=1 \ldots U$;

where I is the identity matrix;

where $\text{diag}(\gamma)$ is a diagonal matrix with the individual grants $\gamma_n$, $n=1 \ldots U$ of said plurality of users as diagonal elements;

where $\gamma$ is a vector of the individual grants $\gamma_n$, $n=1 \ldots U$;

where function parameter $SF_{DPCCH}$ is a diagonal matrix with the scrambling factors of a dedicated physical control channel of said plurality of users as diagonal elements;

where function parameter $\text{SINR}_{reference}^{G+}$ is a reference signal to interference and noise ratio after application of GRake equalizing for said plurality of users as diagonal elements;

where:

$$R(\gamma) = \begin{pmatrix} \alpha_1(1+\gamma_1) & 1+\gamma_2 & 1+\gamma_3 & \ldots & 1+\gamma_U \\ 1+\gamma_1 & \alpha_2(1+\gamma_2) & 1+\gamma_3 & \ldots & 1+\gamma_U \\ 1+\gamma_1 & 1+\gamma_2 & \alpha_3(1+\gamma_3) & \ldots & 1+\gamma_U \\ \vdots & \vdots & \vdots & \ddots & \vdots \\ 1+\gamma_1 & 1+\gamma_2 & 1+\gamma_3 & \ldots & \alpha_U(1+\gamma_U) \end{pmatrix},$$

where function parameter $\alpha_n$, $n=1 \ldots U$ are self interference factors of said plurality of users;

where function parameter $H_{|h|^2}$ is a diagonal matrix with diagonal elements of $|h_n|^2$, $n=1 \ldots U$; and where 1 is a vector of ones.

19. A method for load scheduling in a wideband code division multiple access communication system utilizing Generalized Rake (GRake) equalizing radio reception, said method comprising:

calculating channel estimates and GRake combining weights for a plurality of users, based on uplink digital radio signals received from the users;

expressing a target loading as a function of the channel estimates and the GRake combining weights and further as a function of transmit powers proportional to individual grants to be made to the plurality of users for a future scheduling time; and calculating a set of individual grants to use for the future scheduling time, for the plurality of users, based on determining the transmit powers associated with the individual grants that maximize throughput for the future scheduling time while maintaining equilibrium with the target loading.

* * * * *

UNITED STATES PATENT AND TRADEMARK OFFICE
CERTIFICATE OF CORRECTION

PATENT NO. : 8,565,094 B2
APPLICATION NO. : 13/203991
DATED : October 22, 2013
INVENTOR(S) : Ringstrom et al.

It is certified that error appears in the above-identified patent and that said Letters Patent is hereby corrected as shown below:

On the Title Page, in the Figure, for Tag "230", in Line 3,
delete "PREDICTEDC" and insert -- PREDICTED --, therefor.

In the Drawings

In Fig. 4, Sheet 3 of 4, for Tag "230", in Line 3, delete "PREDICTEDC" and insert -- PREDICTED --, therefor.

In the Specifications

In Column 8, Lines 54-56, in Equation (A3), delete " $RoT^{Digital\ Receiver}(t) = \dfrac{RTWP^{Digital\ Receiver}(t)}{N^{Digital\ Receiver}(t)} =$ " and insert -- $RoT^{Digital\ Receiver}(t) = \dfrac{RTWP^{Digital\ Receiver}(t)}{N^{Digital\ Receiver}(t)} =$ --, therefor.

In Column 11, Line 60, in Equation (B10), delete " $\hat{w}_u^H \hat{h}_u \hat{h}_u \hat{w}_u \hat{E}_{s,u}$ " and insert -- $\hat{w}_u^H \hat{h}_u^H \hat{h}_u^H \hat{w}_u \hat{E}_{s,u}$ --, therefor.

In Column 14, Line 35, in Equation (B25), delete " $S_{u,RSEPS}^{G+} = \sum_{u_{RSEPS}=1}^{U_{RSEPS}} S_{u(u_{RSPES})}^{G-}, u = 1, \ldots, U$ " and insert -- $S_{u,RSEPS}^{G+} = \sum_{u_{RSEPS}=1}^{U_{RSEPS}} S_{u(u_{RSEPS})}^{G+}, u = 1, \ldots, U$ --, therefor.

Signed and Sealed this
Twenty-second Day of April, 2014

Michelle K. Lee
*Deputy Director of the United States Patent and Trademark Office*

CERTIFICATE OF CORRECTION (continued)
U.S. Pat. No. 8,565,094 B2

In Column 14, Line 40, in Equation (B26), delete "$\hat{w}_u^H \hat{h}_u \hat{h}_u^H \hat{w}_u \hat{E}_{s,u(u_{RSPES})}$" and insert -- $\hat{\mathbf{w}}_u^H \hat{\mathbf{h}}_u \hat{\mathbf{h}}_u^H \hat{\mathbf{w}}_u \hat{E}_{s,u(u_{RSEPS})}$ --, therefor.

In Column 17, Lines 26-29, in Equation (C17), delete "$\begin{pmatrix} |w_1^H h_1| & 0 & 0 \\ 0 & \ddots & 0 \\ 0 & 0 & |w_U^H h_U|^2 \end{pmatrix}$" and insert -- $\begin{pmatrix} |\mathbf{w}_1^H \mathbf{h}_1|^2 & \mathbf{0} & 0 \\ \mathbf{0} & \ddots & \mathbf{0} \\ 0 & \mathbf{0} & |\mathbf{w}_U^H \mathbf{h}_U|^2 \end{pmatrix}$ --, therefor.

In Column 17, Line 37, in Equation (C19), delete "$W_{w^H h}|2 P_{DPCCH}$," and insert -- $\mathbf{W}_{|\mathbf{w}^H \mathbf{h}|^2} \mathbf{P}_{DPCCH}$, --, therefor.

In the Claims

In Column 21, Line 54, in Claim 12, delete "$w_n^H h_n|^2, n=1 \ldots U,$" and insert -- $\left|\mathbf{w}_n^H \mathbf{h}_n\right|^2, n=1\ldots U$, --, therefor.